United States Patent
Usui et al.

(10) Patent No.: US 9,214,099 B2
(45) Date of Patent: Dec. 15, 2015

(54) MAP DATA, MAP DATA PRODUCTION METHOD, STORAGE MEDIUM AND NAVIGATION APPARATUS

(75) Inventors: Yoshimasa Usui, Nagoya (JP); Takayuki Matsunaga, Hachioji (JP)

(73) Assignee: DENSO CORPORATION, Kariya (JP)

( * ) Notice: Subject to any disclaimer, the term of this patent is extended or adjusted under 35 U.S.C. 154(b) by 1257 days.

(21) Appl. No.: 13/015,482

(22) Filed: Jan. 27, 2011

(65) Prior Publication Data

US 2011/0187719 A1    Aug. 4, 2011

(30) Foreign Application Priority Data

Jan. 29, 2010  (JP) .................................. 2010-19097

(51) Int. Cl.
- G08G 1/123 (2006.01)
- G09B 29/10 (2006.01)
- G01C 21/32 (2006.01)

(52) U.S. Cl.
CPC .............. G09B 29/106 (2013.01); G01C 21/32 (2013.01)

(58) Field of Classification Search
CPC ............................... G01C 21/32; G09B 29/106
USPC .......................................................... 701/532
See application file for complete search history.

(56) References Cited

U.S. PATENT DOCUMENTS

| | | | | |
|---|---|---|---|---|
| 6,058,350 A * | 5/2000 | Ihara | ............................... | 701/93 |
| 6,184,823 B1 * | 2/2001 | Smith et al. | .............. | 342/357.31 |
| 6,226,590 B1 * | 5/2001 | Fukaya et al. | ................ | 701/428 |
| 6,427,116 B2 * | 7/2002 | Inoue et al. | .................... | 701/410 |
| 6,650,998 B1 * | 11/2003 | Rutledge et al. | .............. | 707/705 |
| 6,658,351 B2 * | 12/2003 | Seto et al. | ..................... | 701/532 |
| 7,403,852 B2 * | 7/2008 | Mikuriya et al. | ............. | 701/532 |
| 7,698,060 B2 * | 4/2010 | Nomura | ........................ | 701/455 |
| 8,051,051 B2 * | 11/2011 | Nomura | ........................ | 707/694 |
| 8,073,876 B2 * | 12/2011 | Sumizawa et al. | ............ | 707/803 |
| 8,428,876 B2 * | 4/2013 | Lee | ................................ | 701/532 |
| 8,447,790 B2 * | 5/2013 | Kutomi et al. | ................ | 707/803 |
| 8,478,522 B2 * | 7/2013 | Ohira et al. | ................... | 701/450 |
| 8,538,689 B2 * | 9/2013 | Matsunaga | ................... | 701/461 |

(Continued)

FOREIGN PATENT DOCUMENTS

| | | |
|---|---|---|
| CN | 101487717 | 7/2009 |
| CN | 101493822 | 7/2009 |

OTHER PUBLICATIONS

Office Action dated Jul. 23, 2013 issued in corresponding CN patent application No. 201110036966.7 (and English translation).

(Continued)

*Primary Examiner* — Ian Jen
(74) *Attorney, Agent, or Firm* — Posz Law Group, PLC

(57) ABSTRACT

A map data production method is disclosed. The method includes: dividing a record target map area into meshes; creating mesh-unit data elements as groups of mesh-unit data elements so that the groups respectively correspond to the meshes, and each group of mesh-unit data elements describes information on map components of a corresponding one of the meshes in such manner that mesh-unit data elements in the each group respectively describes the information on the map components; creating data files, through (i) organizing, according to map component type, the mesh-unit data elements into sets of mesh-unit data elements and (ii) respectively storing the sets of mesh-unit data elements, each set having a same map component type, in the data files; and creating map data from the plurality of data files.

12 Claims, 7 Drawing Sheets

(56) References Cited

U.S. PATENT DOCUMENTS

| | | | |
|---|---|---|---|
| 8,571,793 B2* | 10/2013 | Matsunaga | 701/461 |
| 2002/0070981 A1* | 6/2002 | Kida | 345/833 |
| 2002/0091485 A1* | 7/2002 | Mikuriya et al. | 701/208 |
| 2003/0158653 A1* | 8/2003 | Sakai | 701/205 |
| 2003/0191579 A1* | 10/2003 | Sakamoto et al. | 701/202 |
| 2004/0117109 A1* | 6/2004 | Kodani et al. | 701/200 |
| 2004/0217980 A1* | 11/2004 | Radburn et al. | 345/672 |
| 2005/0027445 A1* | 2/2005 | McDonough | 701/208 |
| 2005/0075119 A1* | 4/2005 | Sheha et al. | 455/456.6 |
| 2005/0203937 A1* | 9/2005 | Nomura | 707/102 |
| 2005/0270311 A1* | 12/2005 | Rasmussen et al. | 345/677 |
| 2006/0155462 A1* | 7/2006 | Sumizawa et al. | 701/208 |
| 2007/0080830 A1* | 4/2007 | Sacks | 340/995.1 |
| 2007/0106463 A1* | 5/2007 | Nomura | 701/208 |
| 2007/0233367 A1* | 10/2007 | Chen et al. | 701/207 |
| 2007/0266055 A1* | 11/2007 | Nomura | 707/200 |
| 2008/0046172 A1* | 2/2008 | Ames et al. | 701/208 |
| 2008/0109159 A1* | 5/2008 | Shi et al. | 701/208 |
| 2008/0192053 A1* | 8/2008 | Howell et al. | 345/427 |
| 2008/0222083 A1* | 9/2008 | Lim | 707/1 |
| 2008/0275633 A1* | 11/2008 | Cummings | 701/200 |
| 2008/0291205 A1* | 11/2008 | Rasmussen et al. | 345/441 |
| 2009/0013273 A1* | 1/2009 | Fuchs et al. | 715/764 |
| 2009/0063042 A1* | 3/2009 | Santesson et al. | 701/209 |
| 2009/0243925 A1* | 10/2009 | Kellermeier et al. | 342/357.07 |
| 2009/0324134 A1* | 12/2009 | Howell et al. | 382/284 |
| 2011/0187719 A1* | 8/2011 | Usui et al. | 345/441 |
| 2011/0191016 A1* | 8/2011 | Nomura et al. | 701/200 |
| 2011/0191020 A1* | 8/2011 | Matsunaga | 701/201 |
| 2011/0191357 A1* | 8/2011 | Tanaka et al. | 707/752 |
| 2011/0191379 A1* | 8/2011 | Watanabe et al. | 707/792 |
| 2011/0191387 A1* | 8/2011 | Kutomi et al. | 707/803 |
| 2011/0191388 A1* | 8/2011 | Matsunaga et al. | 707/803 |
| 2012/0084002 A1* | 4/2012 | Matsunaga | 701/430 |

OTHER PUBLICATIONS

Office Action dated mailed Aug. 20, 2013 issued in corresponding JP patent application No. 2010-019097 (and English translation).

Office Action mailed Nov. 2, 2012 in corresponding CN Patent Application No. 201110036966.7 (and English translation).

H. Fujimoto, "World Wide Vehicle Navigation System Using KIWI Format," *DENSO Technical Review*, vol. 6, No. 1, pp. 29-34 (2001) (English abstract: enclosed; discussed on p. 1 of the Specification).

U.S. Appl. No. 13/013,846, filed Jan. 26, 2011, Nomura et al.
U.S. Appl. No. 13/013,865, filed Jan. 26, 2011, Kutomi et al.
U.S. Appl. No. 13/014,175, filed Jan. 26, 2011, Tanaka et al.
U.S. Appl. No. 13/014,043, filed Jan. 26, 2011, Matsunaga et al.
U.S. Appl. No. 13/013,881, filed Jan. 26, 2011, Watanabe et al.
U.S. Appl. No. 13/013,911. filed Jan. 26, 2011, Matsunaga.

* cited by examiner

FIG. 5A

| ROAD MAP FILE |
|---|
| THE NUMBER M OF MESHES |
| OFFSET TO ROAD DATA ELEMENT FOR MESH 1 |
| OFFSET TO ROAD DATA ELEMENT FOR MESH 2 |
| ... |
| OFFSET TO ROAD DATA ELEMENT FOR MESH (M-1) |
| OFFSET TO ROAD DATA ELEMENT FOR MESH M |
| ROAD DATA ELEMENT FOR MESH 1 |
| ROAD DATA ELEMENT FOR MESH 2 |
| ... |
| ROAD DATA ELEMENT FOR MESH (M-1) |
| ROAD DATA ELEMENT FOR MESH M |

FIG. 5B

| BACKGROUND MAP FILE |
|---|
| THE NUMBER M OF MESHES |
| OFFSET TO BACKGROUND DATA ELEMENT FOR MESH 1 |
| OFFSET TO BACKGROUND DATA ELEMENT FOR MESH 2 |
| ... |
| OFFSET TO BACKGROUND DATA ELEMENT FOR MESH (M-1) |
| OFFSET TO BACKGROUND DATA ELEMENT FOR MESH M |
| BACKGROUND DATA ELEMENT FOR MESH 1 |
| BACKGROUND DATA ELEMENT FOR MESH 2 |
| ... |
| BACKGROUND DATA ELEMENT FOR MESH (M-1) |
| BACKGROUND DATA ELEMENT FOR MESH M |

MAP DATA, MAP DATA PRODUCTION METHOD, STORAGE MEDIUM AND NAVIGATION APPARATUS

CROSS REFERENCE TO RELATED APPLICATION

The present application is based on and claims priority to Japanese Patent Application No. 2010-19097 filed on Jan. 29, 2010, disclosure of which is incorporated herein by reference.

BACKGROUND OF THE INVENTION

1. Field of the Invention:

The present invention relates to map data, a map data production method, a computer readable storage medium storing map data, and a navigation apparatus having map data.

2. Description of Related Art:

A KIWI format is known as a format of map data for navigation apparatuses (see Eiji FUJIMOTO, "Map Data Format KIWI for Car Navigation Apparatuses", DENSO technical review, 2001, vol. 6, part 1, pp. 29-34). According to the KIWI format, the map data is constructed so that a map record target area (an area covered by a map) is divided into multiple meshes. Data about a road component and data about a background component are integrated on a one-mesh-by-one-mesh basis. In the above, the road component and the background component are components of the map.

In the case shown in FIG. 7, the data about a road component and the data about a background component are integrated into multiple data elements in units of mesh, so that the multiple data elements are made into multiple data files. In this case, since the multiple data files form the map data, the map data covering a large area results in a huge number of data files in accordance with the number of meshes.

When the map data has a huge number of data files, it takes a considerable amount of time to install the map data on a hard disk drive due to the huge number of data files.

In recent years, a navigation apparatus including a hard disk drive having map data is becoming popular. In manufacturing this type of navigation apparatus, it is necessary to transfer (install) map data on a hard disk drive of the navigation apparatus. A considerable amount of time required for this kind work is disadvantageous.

SUMMARY OF THE INVENTION

In view of the above and other points, it is an objective of the present invention to provide a technique to improve a transfer efficiency of map data, e.g., an efficiency relating to installation of map data.

According to a first aspect of the present invention, a map data production method is provided that includes: dividing a record target map area into a plurality of meshes; creating a plurality of mesh-unit data elements as a plurality of groups of mesh-unit data elements so that the plurality of groups respectively corresponds to the plurality of meshes, and each group of mesh-unit data elements describes information on map components of a corresponding one of the plurality of meshes in such manner that mesh-unit data elements in the each group respectively describes the information on the map components; creating a plurality of data files, through organizing, according to map component type, the plurality of mesh-unit data elements into a plurality of sets of mesh-unit data elements and respectively storing the plurality of sets, each set of mesh-unit data elements having a same map component type, in the plurality of data files; and creating map data from the plurality of data files.

According to the above map data production method, it is possible to improve a transfer efficiency of map data, e.g., an efficiency relating to installation of map data.

According to a second aspect of the present invention, a map data production method is provided that includes: dividing a record target map area into a plurality of meshes; creating a plurality of road component mesh-unit data elements on a mesh basis so that the plurality of road component mesh-unit data elements respectively corresponds to the plurality of meshes and each road component mesh-unit data element describes information on a road component of a corresponding one of the plurality of meshes; creating a plurality of mesh-unit background component data elements on the mesh basis so that the plurality of mesh-unit background component data elements respectively corresponds to the plurality of meshes and each mesh-unit background component data element describes information on a background component of a corresponding one of the plurality of meshes; creating a first data file and a second data file in such manner that the plurality of mesh-unit road component data elements is collected into the first data file and the plurality of mesh-unit background component data elements is collected into the second data file; and creating map data from the first file and the second file.

According to the above map data production method, it is possible to improve a transfer efficiency of map data, e.g., an efficiency relating to installation of map data.

According to a third aspect of the present invention, map data is provided that includes a plurality of mesh-unit data elements, wherein: the plurality of mesh-unit data elements is a plurality of groups of mesh-unit data elements; the plurality of groups respectively corresponds to a plurality of meshes into which a record target map area is divided; each group of mesh-unit data elements describes information on map components of a corresponding one of the plurality of meshes in such manner that mesh-unit data elements in the each group respectively describe the information on the map components; and the plurality of mesh-unit data elements is retained in a form of a plurality of data files in such way that a set of mesh-unit data elements having a same map component type is collected in each data file.

According to the above map data, it is possible to improve a transfer efficiency of the map data, e.g., an efficiency relating to installation of the map data.

According to a fourth aspect of the present invention, map data is provided that includes a plurality of mesh-unit road component data elements and a plurality of mesh-unit background component data elements, wherein: the plurality of mesh-unit road component data elements respectively corresponds to a plurality of meshes into which a record target map area is divided; each mesh-unit road component data element describes information on a road component of a corresponding one of the plurality of meshes; the plurality of mesh-unit background component data elements respectively corresponds to the plurality of meshes; each mesh-unit background component data element describes information on a background component of a corresponding one of the plurality of meshes; the plurality of mesh-unit road component data elements is retained in a form of a first data file into which the plurality of mesh-unit road component data elements is collected; and the plurality of mesh-unit background component data elements is retained in a form of a second data file into which the plurality of mesh-unit background component data elements is collected.

According to the above map data, it is possible to improve a transfer efficiency of the map data, e.g., an efficiency relating to installation of the map data.

BRIEF DESCRIPTION OF THE DRAWINGS

The above and other objects, features and advantages of the present invention will become more apparent from the following detailed description made with reference to the accompanying drawings. In the drawings:

FIG. 5A is a diagram illustrating a structure of a road map file;

FIG. 5B is a diagram illustrating a structure of a background map file;

DETAILED DESCRIPTION OF EMBODIMENTS

Embodiments of the present invention will be described below with reference to the accompanying drawings. In the followings, first, a map data production method will be described with reference to FIG. 1. Then, a navigation apparatus 10 having the map data will be described below with reference to FIG. 6.

<1 Map Data Production Method>

The map data disclosed herein can be used for a navigation apparatus 10 equipped in a vehicle. In the map data, roads are expressed in units of links, and road networks are expressed with link connections. The navigation apparatus 10 displays a map by superimposing a road image on a background image. The map data produced by the below-described method includes, as information (i.e. data) about map components, information on a road component and information on a background component.

<1.1 First Stage>

Figure 1:
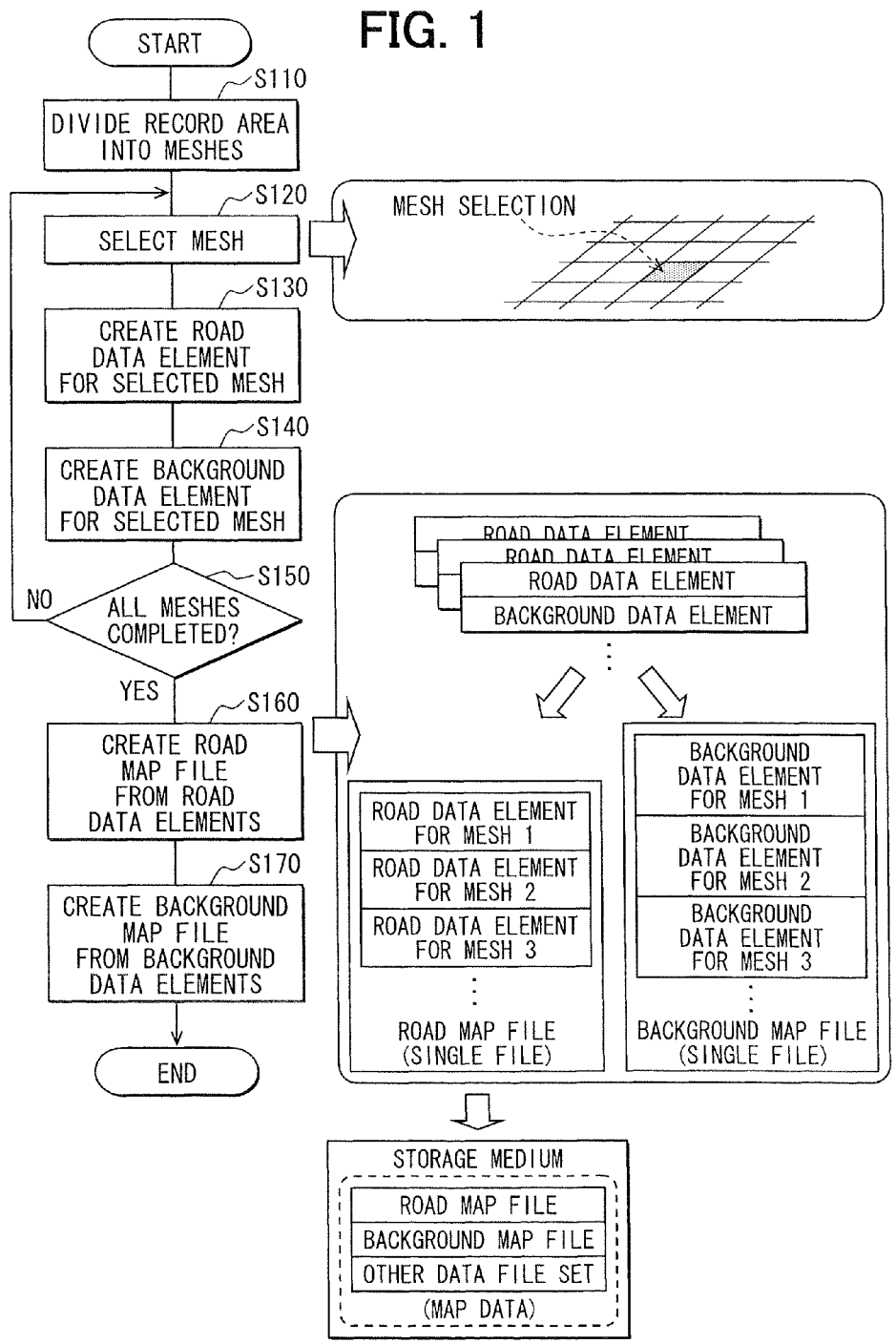
FIG. 1 is a diagram illustrating a map data production method.

FIG. 1 illustrates a flowchart of a map data production procedure.

At S110, a map record target area (also referred to hereinafter as a record area) is divided into multiple meshes (also referred to as sections).

At S120, one of the multiple meshes is selected as a target mesh.

At S130, data about a road, component of the target mesh of the record area (map) is created as a mesh-unit road component data element. Specifically, the mesh-unit road component data element is created so as to describe attribute information of every link in the target mesh. In the mesh-unit road component data element, information indicative of shape, length and position of each link in the target mesh, information indicative of link connection relationship, and the like are described as the attribute information of the link.

At S140, data about a background component of the target mesh of the map is created. Specifically, a mesh-unit background component data element is created so as to describe type (i.e., background type) and position (i.e., layout position) of every background component of the target mesh. The navigation apparatus 10 displays a background image by combining fragmented pieces of image data. In the mesh-unit background component data element, information on type and position of a piece is described as information on a minimum displayable information piece of the background image of the image data of the map data.

At S150, it is determined whether the mesh-unit road component data elements for all meshes of the record area and the mesh-unit background component data elements for all meshes of the record are has been created. When it is determined that the mesh-unit road component data elements for all meshes of the record area and the mesh-unit background component data elements have not been created yet, the determination NO is made at S150 and, the process returns to S120. When it is determined that the mesh-unit road component data elements for all meshes of the record area and the mesh-unit background component data elements for all meshes of the record are has been created, the determination YES is made at S150 and, the process proceeds to S160. In this way, for every mesh in the record area, a process of creating the mesh-unit road component data element and the mesh-unit background component data element is preformed at S130 and S140 while the target mesh is being changed at S120. That is, a loop S120 to S150 is cyclically performed. At the first stage, the mesh-unit road component data element and the mesh-unit background component data element are created in units of mesh.

Now, the mesh-unit road component data element and the mesh-unit background component data element will be more specifically described with reference to FIGS. 2 to 4.

<1.1.1 Mesh-Unit Road Component Data Element>

Figure 2:
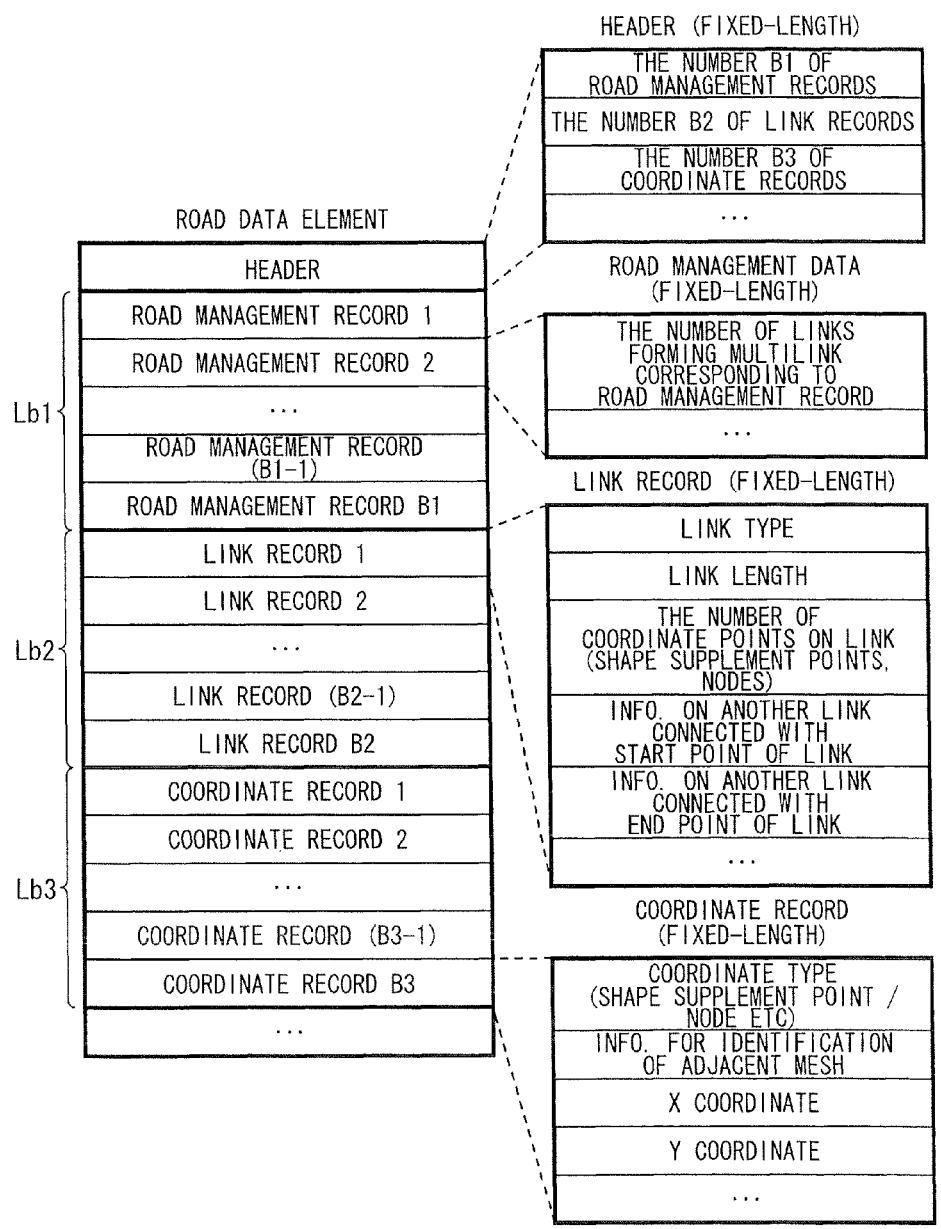
FIG. 2 is a diagram illustrating a structure of a mesh-unit road component data element.

In the present embodiment, the mesh-unit road component data element can have a data structure illustrated in FIG. 2. The mesh-unit road component data element includes a header, a road management list Lb1 having a group of road management records 1 to B1, a link list Lb2 having a group of link records 1 to B2, a coordinate list Lb3 having a group of a coordinate records 1 to B3, and the like.

<1.1.1.1 Header>

The header of the mesh-unit road component data element is fixed-length. The header describes information on the number B1 of road management records, the number B2 of links records, the number B3 of coordinate records, and the like.

<1.1.1.2 Road Management Record>

The record management record is fixed-length, and describes information on the number of links and the like. The road management record manages a multilink (also called a link string), which is a set of links which are continuously connected with each other and which represent one street. The number of links described in the record management record represents the number of links forming the multilink managed by the road management record.

More specifically, in the creation of the mesh-unit road component data element, links in the mesh are grouped according to such an idea that the links in the mesh are organized into multilinks each representing one street. Thus, the mesh-unit road component data element includes the multiple road management records that respectively correspond to the multilinks made by the grouping. In addition to the number of links, each road management record can describe another data indicative of a characteristic of the corresponding multilink (street).

<1.1.1.3 Link Record>

The link record is fixed-length and describes principal attribute information of a link. The mesh-unit road component data element includes the multiple link records that respectively correspond to the links in the mesh.

The principal attribute information of a link, which is described in the link record, includes link type, link length, information on the number of coordinate points from the start point and the end point of the link, information on another link connected with the start point of the link, information on another link connected with the end point of the link, and the like.

Figure 3A:
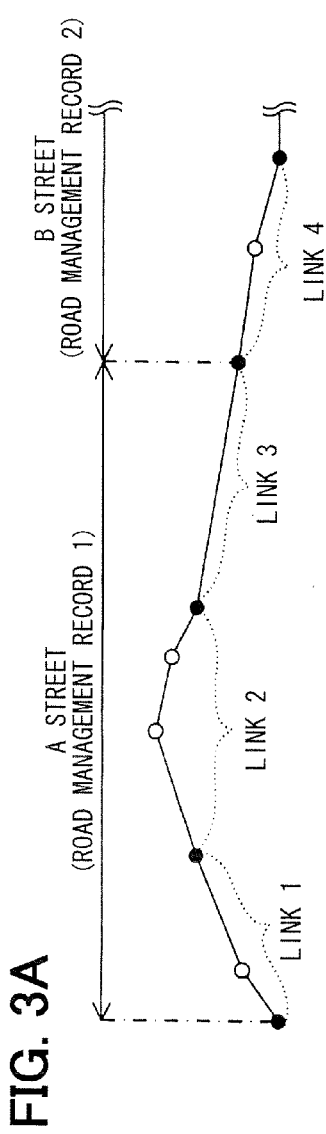
FIGS. 3A and 3B are diagrams illustrating a correspondence relation between road management records, link records, and coordinate records.

According to an example shown in FIG. 3A, two nodes (see filled circles in FIG. 3A) are set on both ends of a link, and shape complement points (see open circles in FIG. 3A) are set between the ends of the link. The shape complement points are used to represent shape (e.g., curve) of a link between ends of the link. The number of coordinate points described in the link record corresponds to the number of nodes and shape complement points set on the link.

The information on another link connected with the start point of the link and the information on another link connected with the end point of the link are described in such manner that another link (connection partner) is expressed using arrangement numbers of link records 1 to B2 in the link list Lb2. The map data of the present embodiment does not assign absolute link IDs to links, although conventional map data does. In the present embodiment, the information on another link is expressed using arrangement numbers of links record 1 to 82 in the link list Lb2. For example, when the start point of the link is connected with a link corresponding to the link record having the arrangement number "2" in the link list Lb2, the arrangement number "2" is described as the information on another link connected with the startpoint of the link.

If the start point or the end point of a subject link is not connected with another link in the same mesh, the arrangement number of the subject link is described as the information on another link. A link failing to have the start point or the end point connected with another link in the same mesh is, for example, a link representing a road having a dead end, and a link in which an edge point (start point or end point) is a node located at a boundary with an adjacent mesh and connected with only a link in the adjacent mesh. In the present embodiment, since the mesh-unit data elements are made into closed data elements, a link connection relationship is described as including only a relation between links in one mesh even if the links in the one mesh are connected with a link in an adjacent mesh via a boundary node located at the boundary with the adjacent mesh.

<1.1.1.4 Coordinate Record>

The coordinate list Lb3 of the mesh-unit road component data element includes a group of coordinate records 1 to B3. The coordinate list Lb3 describes coordinate points (latitude and longitude) of all of nodes and shape complement points set on all links registered in the link list L2b on a coordinate-point-by-coordinate-point basis. Each coordinate record 1 to B3 indicates a coordinate point of a corresponding one of the nodes and the shape supplement points.

Specifically, the coordinate record is fixed-length and describes information on coordinate type, X coordinate (i.e., a coordinate in a longitude direction), Y coordinate (i.e., a coordinate in a latitude direction), and the like. The coordinate type designates type of the coordinate point, e.g., boundary node, node other than boundary node, dummy node, shape supplement point or the like.

The coordinate record further describes identification information, which is information for identification of an adjacent mesh connected with a boundary node. This identification information is described as a valid value only when the coordinate record has "boundary node" as the coordinate type. The information is described as being null when the coordinate type of the coordinate record is other than "boundary node". The boundary node is located at a boundary with an adjacent mesh. The identification information, which is information for identification of an adjacent mesh connected with a boundary node, designates the location of the boundary node from among four sides or four corners of a rectangular mesh corresponding to the discussing mesh-unit data element.

<1.1.1.5 Data Arrangement>

With reference to FIG. 3, explanation will be given on an arrangement of the road management records 1 to B1 in the road management list Lb1, an arrangement of the link records 1 to B2 in the link list Lb2, and an arrangement of the coordinate records 1 to B3 in the coordinate list Lb3.

As described above, the road management records 1 to B1 are provided to manage the multilinks. The road management records 1 to B1 have principal attribute information on links and coordinate information on points (nodes and shape supplement points) set on the links. More specifically, each coordinate record is data that should be associated with a corresponding link record, and each link record is data that should be associated with a corresponding road management record.

Figure 3B:
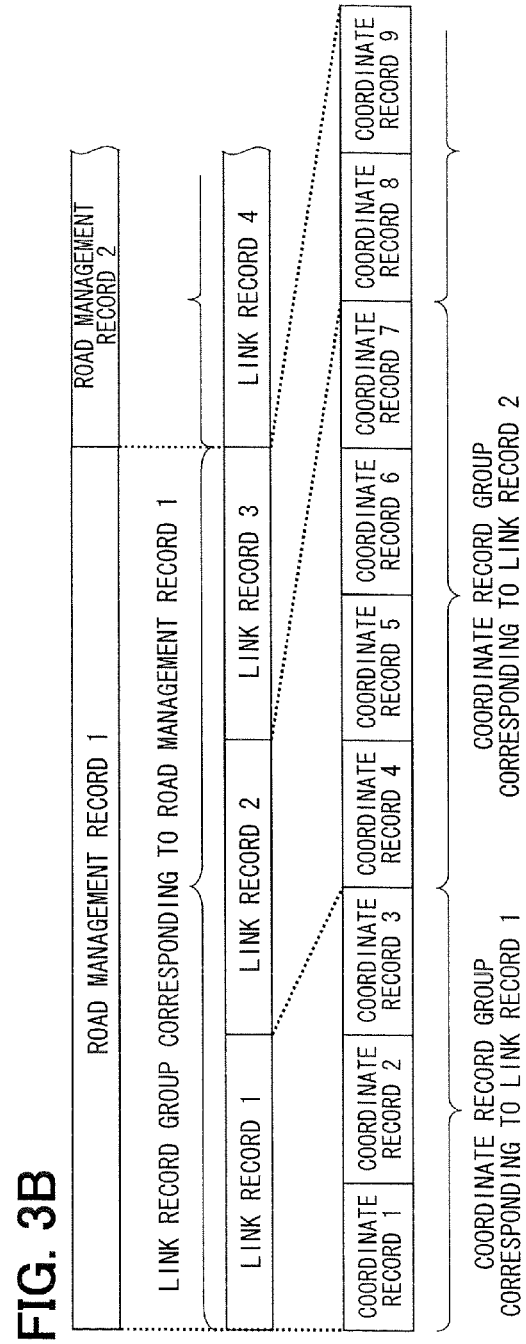

In the present embodiment, the records of the road management list Lb1, the records of the link list Lb2, and the records of the coordinate list Lb3 are associated with each other in such manner that an arrangement order of the records of the road management list Lb1, an arrangement order of the records of the link list Lb2, and an arrangement order of the records of the coordinate list Lb3 are matched with each other. FIG. 3B is a diagram illustrating an association between the road management list Lb, the link list Lb2 and the coordinate list Lb3 based on the example of FIG. 3A.

In the present embodiment, as shown in FIG. 3B, the link list Lb2 includes a first group of link records that corresponds to a first multilink represented by the road management record 1, which has the arrangement number "1" in the road management list Lb1. The first group of link records is located at the beginning of the link list Lb2. The link list Lb2 further includes a second group of link records that corresponds to a second multilink represented by the road management record 2, which has the arrangement number "2" in the road management list Lb1. The second group of link records is consecutively located next to the first group of link records corresponding to the first multilink represented by the road management record 1. In this way, the road management list Lb1 and the link list Lb2 are created so that the records of the road management list Lb1 and those of the link list Lb2 are arranged in the same order to establish an association of multiple street-related attributes.

In the present embodiment, (i) an arrangement of streets corresponding to an arrangement of the road management records 1 to B1 in the road management list Lb1 and (ii) an arrangement of streets corresponding to an arrangement of link records 1 to B2 in the link list Lb2 are matched with each other so as to have the same arrangement order; thereby the records of the road management list Lb1 are associated with the records of the link list Lb2.

Since each road management record describes information on the number of links, one record management record can be associated with multiple link records. However, by consecutively referring to or reading the records from the beginning of the road management list Lb1 and the beginning of the link list Lb2, it is possible to specify a relation between the road management records 1 to B1 and the link records 1 to B2.

In the present embodiment, as shown in FIG. 3B, a first group of coordinate records is set on a link corresponding to the link record 1, which has the arrangement number "1" in the link list Lb2. The first group of coordinate records is located at the beginning of the coordinate list Lb3. A second group of coordinate records is set on a link corresponding to the link record 2, which has the arrangement number "2" in the list Lb2. In the coordinate list Lb3, the second group of coordinate records is consecutively located next to the first group of coordinate records corresponding to the link record 1. In this way, the link list Lb2 and the coordinate list Lb3 are created so that the records of the link Lb2 and those of the coordinate list Lb3 are arranged in the same order.

More specifically, in the present embodiment, (i) an arrangement of links corresponding to an arrangement of the coordinate records 1 to B3 in the coordinate list Lb3 and (ii) an arrangement of links corresponding to the link records 1 to B3 in the link list Lb2 are matched with each other so as to have the same arrangement order; thereby, the records of the link list Lb2 and the records of the coordinate list Lb3 are associated with each other. Since each link record describes information on the number of coordinate points, one link record can be associated with multiple coordinate records. In this case also, by consecutively referring to or reading the records from the beginning of the link list Lb2 and the beginning of the coordinate list Lb3, it is possible to specify a relation between the link records 1 to B2 and the coordinate records 1 to B3. A group of coordinate records corresponding to one link record (a certain link) are arranged in the coordinate list Lb3 in such manner that the coordinate records in the group is arranged in an order from the start point to the end point of the certain link. In the above, registration of the coordinate record for the end point of a link may be omitted because the coordinate record for the end point of a certain link has the same coordinate point as the coordinate record for the start point of an adjacent link has.

<1.1.2 Mesh-Unit Background Component Data Element>

Figure 4A:
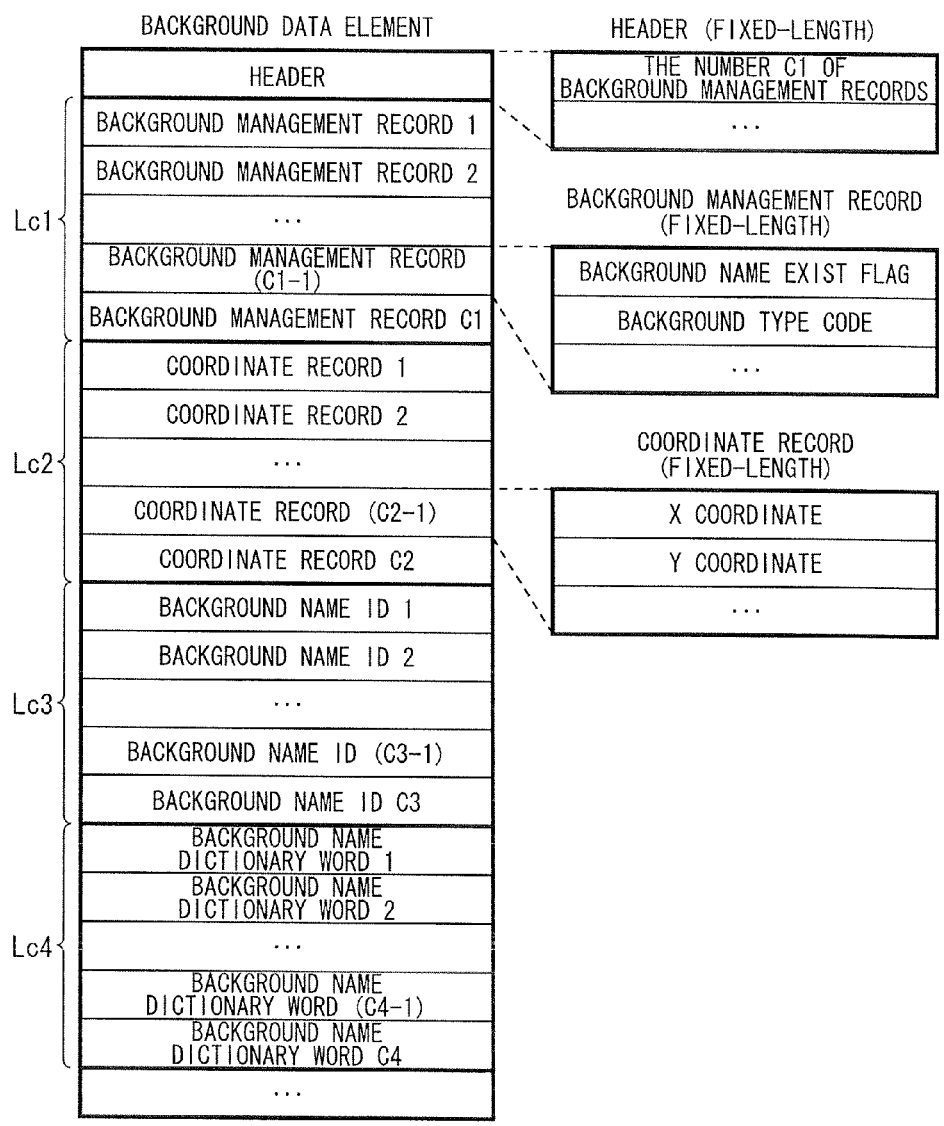
FIGS. 4A and 4B are diagrams illustrating a structure of a mesh-unit background component data element.

As shown in FIG. 4A, the mesh-unit background component data element includes a header, a back ground management list Lc1 having a group of background management records 1 to C1, a coordinate list Lc2 having a group of coordinate records 1 to C2, a background name ID list Lc2 having a group of background name IDs 1 to C3, and a background name dictionary Lc4 having a group of background dictionary register words 1 to C4.

<1.1.2.1 Header>

A Header of the mesh-unit background component data element is fixed-length, and describes the number C1 of background management records, and the like.

<1.1.2.2. Background Management Record>

The background management record is fixed-length and includes information on background name existence/nonexistence flag, information on background type code, and the like.

The background type code indicates type of a background image (background item) displayed on a map. For example, the background type codes indicate types of background images, and are classified according to facility, terrain and the like, such as bank, library, art museum, park, mall, railway, airport, ocean, lake, island and the like. A back ground image corresponding to the background type code is displayed on a map while being laid out at a coordinate point indicated by the coordinate record corresponding to the background management record.

The background name existence/nonexistence flag indicates whether a background name to be displayed on the map is registered in the background name dictionary Lc4. For example, name of a facility etc. corresponding to the background image may be displayed on a map together with the background image. For this kind purpose, the background name is used <1.1.2.3 Coordinate Record>

Each coordinate record, which is described in the mesh-unit background component data element, indicates layout position (e.g., coordinate point) of the background image corresponding to the background management record registered in the background management list Lc1. The coordinate record is fixed-length, and includes information on an X coordinate (i.e., a longitude direction coordinate) and a Y coordinate (i.e., a latitude direction coordinate).

In the mesh-unit background component data element, the number of coordinate records 1 to C2 in the coordinate list Lc2 is equal to the number of background management records 1 to C1 in the background management list Lc1. The coordinate records 1 to C2 in the coordinate list Lc2 have a one-to-one correspondence with the background management records 1 to C1

Figure 4B:
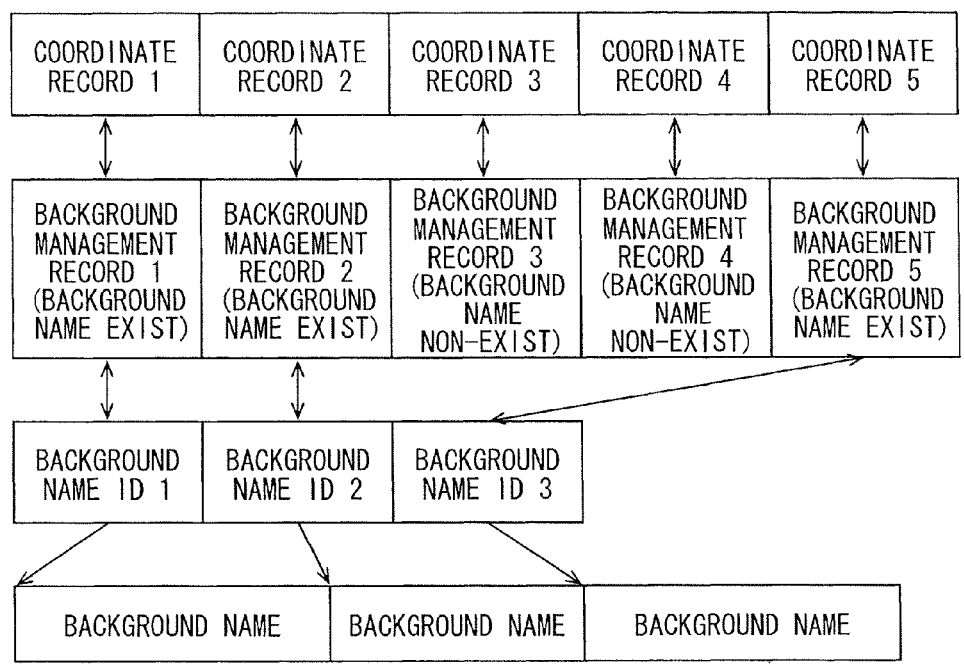

More specifically, as shown in FIG. 4B, each coordinate record 1 to C2 is for layout of a background image (also called herein unit image or background item) corresponding to the background management record in the background management list Lc1. The coordinate records 1 to C2 are arranged in the coordinate list Lc2 in the same order as the corresponding background management records are arranged in the background management list Lc1. In this way, the background management records 1 to C1 are associated with the coordinate records 1 to C2.

<1.1.2.4 Background Name ID>

The background name ID is used when name of the background item corresponding to the background management record is read from the background name dictionary Lc4. The background name ID is expressed with an offset (e.g., byte location, number of bytes) from the beginning of the background name dictionary Lc4. The background name ID is fixed-length. In the map data produced by the method of the resent embodiment, name of the background item is read from the background name dictionary Lc4 based on the background name ID.

As shown in FIG. 4B, an arrangement order of the background name IDs 1 to C3 in the background ID list Lc3 and an arrangement order of background management records 1 to C1 in the background management list Lc1 are matched with each other so that the background name IDs 1 to C3 in the background ID list Lc3 have an one-to-one correspondence to the background management records 1 to C1 in the background management list Lc1.

In other words, in creation of the background name ID list Lc3, the background name IDs are arranged in the same order as the corresponding background management record are arranged in the background management list Lc1 in order of increasing arrangement number. When some of the background names corresponding to the background management records are omitted, the background name ID corresponding to the omitted background name may not included in the background list Lc3, and the background name ID corresponding to the background management record having the next arrangement number may be located at the place for the background name ID corresponding to the omitted background name.

As described above, the background name existence/nonexistence flag of a certain background management record has a value indicative of "no information" when the certain background management record corresponds to the background item whose name is not register in the background name ID of the background name ID list Lc3. Therefore, by referring to and reading the background name IDs from the beginning of the background name ID list Lc3 with reference to the background name existence/nonexistence flags, it is possible to catch a correspondence relationship between the background management records 1 to C1 and the background name IDs 1 to C3.

<1.1.2.5 Background Name Dictionary Register Word>

The background name dictionary Lc4 has a group of variable-length background name dictionary register words 1 to C4. Each background name dictionary register word is configured as a character string representing the background name.

<1.2 Second Stage>

When the first stage of the map data production method is completed, the mesh-unit road component data element and the mesh-unit background component data element have been created on a one-mesh-by-one-mesh basis. That is, multiple group of mesh-unit data elements, each group including the mesh-unit road component data element and the mesh-unit background component data element, are created to respectively correspond to the multiple meshes of the record area.

At S160 and S170, multiple group of mesh-unit data elements, each group corresponding to one mesh and including the mesh-unit road component data element and the mesh-unit background component data element for the one mesh, are organized into multiple sets of mesh-unit data elements according to map component type (e.g., road component, background component). As shown in FIG. 1, the multiple sets of mesh-unit data elements are respectively stored in multiple data files. More specifically, at S160, a road map file is created as a data file that collects therein the mesh-unit road component data elements, which respectively correspond to the multiple meshes. At S170, a background map file is created as a data file that collects therein the mesh-unit background component data elements, which respectively correspond to the multiple meshes. According to the related art, the mesh-unit road component data element and the mesh-unit background component data element are collected into a data file on one-mesh-one-mesh basis. According to the present embodiment, by contrast, the multiple mesh-unit data elements are organized into data files according to map component type.

The road map file and the background map file created at S160 and S170 are described below more specifically. FIG. 5A is a diagram illustrating a structure of the road map file. FIG. 5B is a diagram illustrating a structure of the background map file.

As shown in FIG. 5A, in the creation of the road map file at S160, management data is inserted at the beginning of the multiple mesh-unit road component data elements.

The management data includes a fixed-length mesh number data element. The mesh number data element describes the number M of meshes, which is equal to the number of mesh-units road component data elements registered in the data file (the road map file). After the mesh number data element, the management data further includes fixed-length offset information elements, which indicate information on offsets to the multiple mesh-unit road component data elements. The offset information elements are set to respectively correspond to the multiple meshes of the record area so that each offset information element indicates storage location of a corresponding one of the multiple mesh-unit road component data elements.

More specifically, the offset information element presents byte location (location expressed with byte) relative to a reference location to show the storage location of the corresponding mesh-unit road component data element in the road map file. The reference location may be the beginning of the data file (the road map file), the beginning (description start location) of this offset information element, or the like. Alternatively, the reference location may be the beginning of the multiple mesh-unit road component data elements, which is just after the end of the management data.

The offset information elements, which respectively correspond to the multiple meshes, are arranged in the road map file in an order corresponding to a predetermined mesh arrangement order. In accordance with this, the multiple mesh-unit road component data elements are arranged in the road map file in the order corresponding to the predetermined mesh arrangement order.

In a way similar to S160, a background map file is created at S170 by inserting management data at the beginning of the multiple mesh-unit background component data elements, which respectively correspond to the multiple meshes of the record area. The management data of the background map file includes a fixed-length mesh number data element. The mesh number data element describes the number M of meshes, which is equal to the number of mesh-unit background component data elements registered in the data file (the background map file). After the mesh number data element, the management data further includes fixed-length offset information elements, which are information on offsets to the multiple mesh-unit background component data elements. The multiple mesh-unit background component data elements, which correspond to the multiple meshes of the record area, are arranged after the management data.

Each offset information element indicates an offset to the corresponding mesh-unit background component data element. More specifically, each offset information element shows byte location relative to a reference location to indicate storage location of the corresponding mesh-unit background component data element in the background map file. The offset information elements are arranged in the management data in an order corresponding to the predetermined mesh arrangement order, which order is the same as that in the road map file. In accordance with this, the multiple mesh-unit background component data elements are arranged in the background map file in the order corresponding to the predetermined mesh arrangement order.

In the present embodiment, the mesh-unit road component data elements are arranged in the road map file in the same order as the mesh-unit background component data elements are arranged in the background map file. More specifically, both of the mesh-unit road component data elements and the mesh-unit background component data elements are arranged in the predetermined mesh arrangement order. In this way, the mesh-unit road component data element for a given mesh and the mesh-unit background component data element for the given mesh are associated with each other.

The road map file and the background map file created in the above way are combined with other necessary data, e.g., images files used for display of road components and background components, so that the combined data set (i.e., a set of data files) is made into the map data. That is, the map data is formed by combining the road map file, the background map file, and the other necessary data such as image files and the like.

When the navigation apparatus 10 is configured to provide 3D (three-dimensional) display of a map in the form of a bird's eye view or the like, multiple mesh-unit 3D component data elements may be further created to describe polygons and coordinates (layout location) associated with types and shapes of buildings etc. The multiple mesh-unit 3D component data elements, which respectively correspond to the multiple meshes of the record area, may be collected into a 3D map file. The 3D map file may be integrated with the above map data.

In the above-described way, the map data production method of the present embodiment produces the map data. The map data is recorded in a computer readable storage medium such as a hard disk drive, a DVD and the like. Thereby, a master disk, which is a storage medium storing the map data (original data), is produced. Then, by using the master disk, the map data is installed or transferred on a hard disk drive of a product (e.g., navigation apparatus 10).

Figure 7:
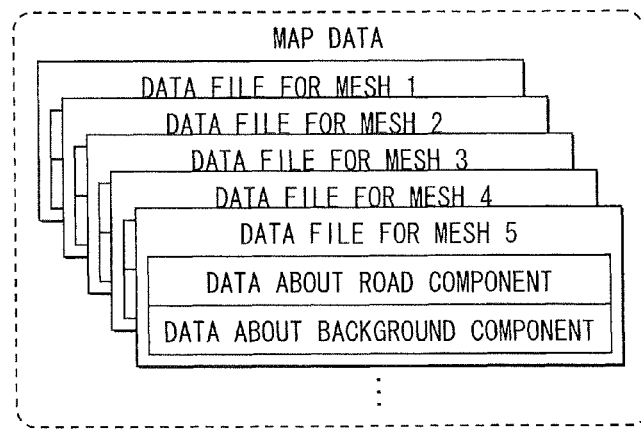
FIG. 7 is a diagram illustrating a structure of a map data according to the related art.

According to the present embodiment, data about a road component for multiple meshes is prepared as the road map file, and data about a background component for multiple meshes is prepared as the background map file. According to the related art, data about a road component and data about a background component for each mesh are integrated on a one-mesh-by-one-mesh basis, and thus, a huge number of data files are created (see FIG. 7). Because the number of data files forming the map data is huge, and it disadvantageously takes a considerable amount of time to install map data on a hard disk drive or the like. In addition, because size of each data file, which corresponds to one mesh, is smaller than cluster size of the hard disk drive, the hard disk drive needs to have a redundant capacity larger than actual size of the map data.

According the present embodiment, by contrast, the mesh-unit data elements corresponding to the multiple meshes are organized and made into the road map file and the background map file. Thus, it is possible to reduce the number of data files, and it is possible to install or transfer the map data to a hard disk drive for a short time of period in an efficient manner.

Moreover, when the navigation apparatus 10 retrieve a navigation route, the navigation apparatus 10 typically reads only the data about a road component from the map data and uses the data about a road component. When the navigation apparatus 10 uses one of the data about a road component and the data about a background component as target data, a data structure of the map data of the present embodiment increases accessibility to target data (desired data), as compared with a data structure of the conventional map data in which the data about a road component and data about a background component are integrated into a data file.

<2. Navigation Apparatus Configuration and Operation >

The navigation apparatus 10 having the above-map data will be more specifically described.

Figure 6:
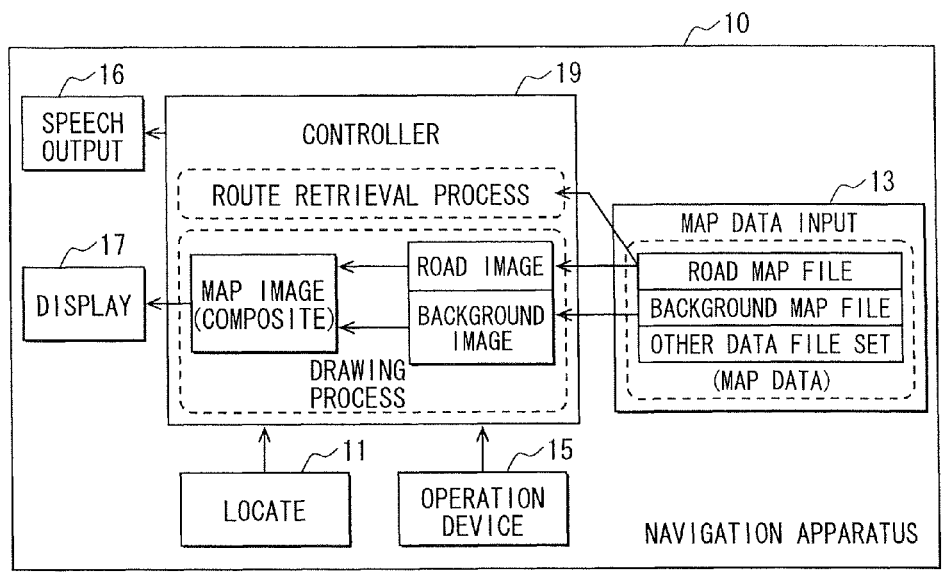
FIG. 6 is a block diagram illustrating a navigation apparatus.

As shown in FIG. 6, the navigation apparatus 10 includes a locating device 11, a map data input device 13, an operation device 15, a speech output device 16, a display device 17, and a controller 19. The locating device 11 locates the present position of the vehicle equipped with the navigation apparatus 10. The locating device 11 includes, for example, a gyroscope, a distance sensor, a GPS receiver and the like.

The map data input device 13 includes a hard disk drive, which can act as a computer readable storage medium storing therein the map data. The map data input device 13 can input the map data to the controller 19. On the hard disk drive of the map data input device 13, the map data is installed via a dedicated apparatus before product shipment. That is, the map data input device 13 stores the map data, which contains the road map file, the background map file and the other necessary data file, in the hard disk drive.

The operation device 15 allows use's instructions to be inputted to the controller 19. The operation device 15 includes a touch sensitive panel provided on the display device 17, a group of operation switches provided on a body of the navigation apparatus 10 or a remote controller, or the like. Via the operation device 15, a user can conduct various operations on the navigation apparatus 10 such as map scale change, map scroll, destination designation, and the like.

The speech output device 16 includes a speaker and the like, and outputs guidance speech or the like upon receiving a signal from the controller 19. The display device 17 can provide full-color display. The display device 17 superimposes a present position mark indicative of the present position of the vehicle detected by the locating device 11, a navigation and the like on a map image made based on the map data inputted from the map data input device 13.

The controller 19 includes a CPU, a ROM, a RAM, an I/O and a bus line connecting the foregoing components. The controller 19 may be configured as a known microcomputer. In the controller 19, the CPU performs various processes to implement navigation functions in accordance with programs stored in the ROM.

For example, the controller 19 performs a drawing process to display a map on the display device 17, a route retrieval process to retrieve a navigation route to a destination designated by a user via the operation device 15, and a route guidance process to conduct guidance of a road, a facility and the like along the navigation route.

In the drawing process, the CPU generates road image data representing a road network by referring to the road map file of the map data, generates background image data by referring to the background map file of the map file, and displays a map on the display device 17 based on composite map image data obtained from the road image data and the background image data.

In the route retrieval process, the CPU refers to the road map file without referring to the background map file in order to read road information such as link length and the like needed for route cost calculation, and performs the route cost calculation based on the read information, thereby retrieving an optimum navigation route to a destination. Via the display device 17 and the speech output device 16, the CPU performs the route guidance process to provide a user with guidance of the navigation route obtained by the route retrieval process.

While the invention has been described above with reference to various embodiments thereof, it is to be understood that embodiments of the present invention are not limited to the above-described embodiments and embodiments can have various forms. For example, the above-described map data and the production method are not limited to only map data for navigation apparatuses equipped with vehicles. For example, the above-described map data and the production method are applicable to map data installed on a portable terminal such as cellular phone and the like.

<Aspects>

According to a first aspect of the present disclosure, a map data production method is provided that includes: dividing a record target map area into a plurality of meshes; creating a plurality of mesh-unit data elements as a plurality of groups of mesh-unit data elements so that the plurality of groups respectively corresponds to the plurality of meshes, and each group of mesh-unit data elements describes information on map components of a corresponding one of the plurality of meshes in such manner that mesh-unit data elements in the each group respectively describes the information on the map components; creating a plurality of data files, through organizing, according to map component type, the plurality of mesh-unit data elements into a plurality of sets of mesh-unit data elements and respectively storing the plurality of sets, each set of mesh-unit data elements having a same map component type, in the plurality of data files; and creating map data from the plurality of data files.

According to the above map data production method, since the plurality of mesh-unit data elements are organized according to map component type and since the organized sets of mesh-unit data elements are respectively made into the plurality of data files, it is possible to reduce the number of data files. In other words, a problem of generation of a huge number of data files each having a small data amount can be solved by the above map production method.

Therefore, it is possible to shorten a processing time of transfer or copy of the map data to a transfer destination device such as a hard disk drive and the like and it is possible to improve a transfer efficiency of map data, e.g., an efficiency relating to installation of map data. In other words, a long processing time of transfer or copy of the map data to a transfer destination device, which long processing time is caused by a huge number of data files, can be solved.

In the above map production method, the plurality of groups of mesh-unit data elements respectively corresponds to the plurality of meshes. Each group may includes a mesh-unit road component data element, which describes information on a road component of a corresponding one of the plurality of meshes, and a mesh-unit background component data element, which describes information on a road component of a corresponding one of the plurality of meshes. Namely, according to a second aspect of the present disclosure, a map data production method is provided that includes: dividing a record target map area into a plurality of meshes; creating a plurality of road component mesh-unit data elements on a mesh basis so that the plurality of road component mesh-unit data elements respectively corresponds to the plurality of meshes and each road component mesh-unit data element describes information on a road component of a corresponding one of the plurality of meshes; creating a plurality of mesh-unit background component data elements on the mesh basis so that the plurality of mesh-unit background component data elements respectively corresponds to the plurality of meshes and each mesh-unit background component data element describes information on a background component of a corresponding one of the plurality of meshes; creating a first data file and a second data file in such manner that the plurality of mesh-unit road component data elements is collected into the first data file and the plurality of mesh-unit background component data elements is collected into the second data file; and creating map data from the first file and the second file.

According to the above map data production method, since the plurality of mesh-unit road component data elements is collected into the first data file and since the plurality of mesh-unit background component data elements is collected into the second data file, an electronic apparatus using the map data such as a navigation apparatus and the like can have an improved efficiency in reading target data (desired data) from the map data For example, a navigation apparatus performs a route retrieval process of retrieving a navigation route to a destination in addition to a drawing process of drawing a map, and basically and typically does not require data about a background component in retrieving a navigation route. Thus, in the route retrieval process, access to map data basically targets the data about a road component. If the data about a road component and the data about a background component are integrated into a data file on a one-mesh-by-one-mesh basis, target data (desired data) are dispersed inside the map data, and thus, it takes a long time to read the target data.

According to the map data production method of the present disclosure, since the data about a road component for the plurality of meshes are collectively integrated into the first data file, the first data file may not include the data about a background component. Thus, it becomes possible to refer to the data about a road component in an efficient manner and it becomes possible to read target data in an efficient manner.

According to a third aspect of the present disclosure, map data is provided that includes a plurality of mesh-unit data elements, wherein: the plurality of mesh-unit data elements is a plurality of groups of mesh-unit data elements; the plurality of groups respectively corresponds to a plurality of meshes into which a record target map area is divided; each group of mesh-unit data elements describes information on map components of a corresponding one of the plurality of meshes in such manner that mesh-unit data elements in the each group respectively describe the information on the map components; and the plurality of mesh-unit data elements is retained in a form of a plurality of data files in such way that a set of mesh-unit data elements having a same map component type is collected in each data file.

According to a fourth aspect of the present disclosure, map data is provided that includes a plurality of mesh-unit road component data elements and a plurality of mesh-unit background component data elements, wherein: the plurality of mesh-unit road component data elements respectively corresponds to a plurality of meshes into which a record target map area is divided; each mesh-unit road component data element describes information on a road component of a corresponding one of the plurality of meshes; the plurality of mesh-unit background component data elements respectively corresponds to the plurality of meshes; each mesh-unit background component data element describes information on a background component of a corresponding one of the plurality of meshes; the plurality of mesh-unit road component data elements is retained in a form of a first data file into which the plurality of mesh-unit road component data elements is collected; and the plurality of mesh-unit background component data elements is retained in a form of a second data file into which the plurality of mesh-unit background component data elements is collected.

These map data can involve the same advantages as the above-described map data production methods can involve.

What is claimed is:

1. A computer readable non-transitory storage medium, supporting transfer of map data, comprising:
a plurality of first mesh-unit data structures and a plurality of second mesh-unit data structures, the plurality of first mesh-unit data structures and the plurality of second mesh-unit data structures respectively corresponding to a plurality of meshes into which a record target area is divided,
each first mesh-unit data structure stores map information of a first map component type of a corresponding mesh,
each second mesh-unit data structure stores map information of a second map component type of the corresponding mesh,
the second map component type being different from the first map component type; and
a map data structure, including:
a road map data structure into which
the plurality of first mesh-unit data structures is collected and retained, and
a road management data structure including first offset elements, which show storage locations of respective first mesh-unit data structures in the road map data structure, is inserted at a beginning of the first mesh-unit data structures; and
a background map data structure into which
the plurality of second mesh-unit data structures is collected and retained, and
a background management data structure including second offset elements, which show storage locations of respective second mesh-unit data structures in the background map data structure, is inserted at a beginning of the plurality of second mesh-unit data structures.

2. A computer readable non-transitory storage medium, supporting transfer of map data, comprising:
a plurality of mesh-unit road component data structures and a plurality of mesh-unit background component data structures, wherein:
the plurality of mesh-unit road component data structures respectively corresponds to a plurality of meshes into which a record target map area is divided,
each mesh-unit road component data structure stores map information of a road component of a corresponding one of the plurality of meshes,
the plurality of mesh-unit background component data structures respectively corresponds to the plurality of meshes, and
each mesh-unit background component data structure stores map information of a background component of a corresponding one of the plurality of meshes; and
a map data structure, including:
a road map data structure into which
the plurality of mesh-unit road component data structures is collected and retained and
a road component management data structure including first offset elements, which show storage locations of respective mesh-unit road component data structures in the road map data structure, is inserted at a beginning of the plurality of mesh-unit road component data structures; and
a background map data structure into which
the plurality of mesh-unit background component data structures is collected and retained, and
a background component management data structure including second offset elements, which show storage locations of respective mesh-unit background component data structures in the background map data structure, is inserted at a beginning of the plurality of mesh-unit background component data structures.

3. A navigation apparatus comprising:
a map data input device storing therein map data recited in claim 1; and
a controller configured to read the map data from the map data input device to perform a navigation operation.

4. A navigation apparatus comprising:
a map data input device storing therein map data recited in claim 2; and
a controller configured to read the map data from the map data input device to perform a navigation operation.

5. The computer readable non-transitory storage medium according to claim 1, wherein:
each first offset information element presents a byte location relative to a first reference location to show the storage location of its respective first mesh-unit data structure in the road map data structure, and
each second offset information element presents a byte location relative to a second reference location to show the storage location of its respective second mesh-unit data structure in the background map data structure.

6. The computer readable non-transitory storage medium according to claim 2, wherein:
each first offset information element presents a byte location relative to a first reference location to show the storage location of its respective mesh-unit road component data structures in the road map data structure, and
each second offset information element presents a byte location relative to a second reference location to show the storage location of the respective mesh-unit background component data structures in the background map data structure.

7. The computer readable non-transitory storage medium according to claim 5, wherein:
the first reference location is a beginning of the road map data structure, and
the second reference location is a beginning of the background map data structure.

8. The computer readable non-transitory storage medium according to claim 6, wherein:
the first reference location is a beginning of the road map data structure, and
the second reference location is a beginning of the background map data structure.

9. The computer readable non-transitory storage medium according to claim 5, wherein:
the first reference location is a beginning of the first offset elements, and
the second reference location is a beginning of the second offset elements.

10. The computer readable non-transitory storage medium according to claim 6, wherein:
the first reference location is a beginning of the first offset elements, and
the second reference location is a beginning of the second offset elements.

11. The computer readable non-transitory storage medium according to claim 1, wherein:
the first offset elements are arranged in the road map data structure in a first predetermined arrangement order,
the second offset elements are arranged in the background map data structure in a second predetermined arrangement order,
the first mesh-unit data structures are arranged in the road map data structure in an order corresponding to the first predetermined arrangement order, and
the second mesh-unit data structures are arranged in the background map data structure in an order corresponding to the second predetermined arrangement order.

12. The computer readable non-transitory storage medium according to claim 2, wherein:
the first offset elements are arranged in the road map data structure in a first predetermined arrangement order,
the second offset elements are arranged in the background map data structure in a second predetermined arrangement order,
the mesh-unit road component data structures are arranged in the road map data structure in an order corresponding to the first predetermined arrangement order, and
the mesh-unit background component data structures are arranged in the background map data structure in an order corresponding to the second predetermined arrangement order.

* * * * *